Nov. 8, 1960   J. A. RIGGS   2,959,254
BRAKE SHOE CONSTRUCTION
Filed Aug. 30, 1956   2 Sheets-Sheet 2
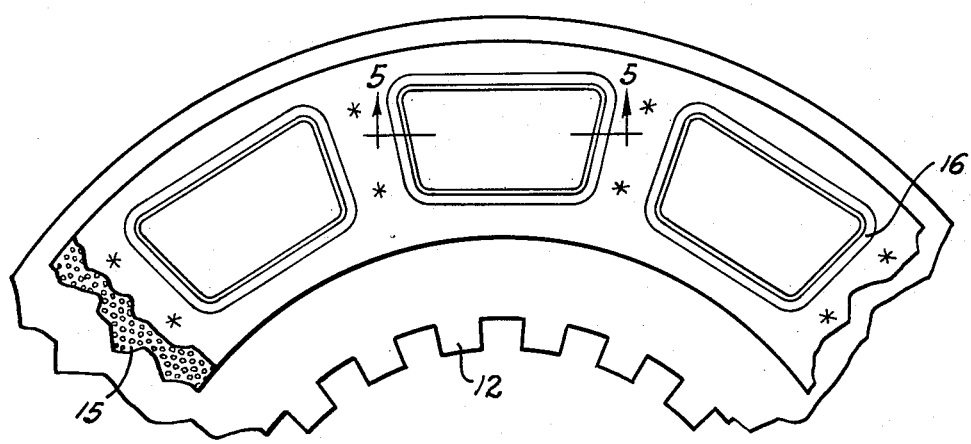
FIG_4
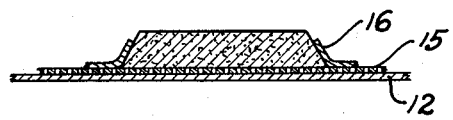
FIG_5
INVENTOR.
JAMES A. RIGGS.
BY
William P. Hickey
ATTORNEY.

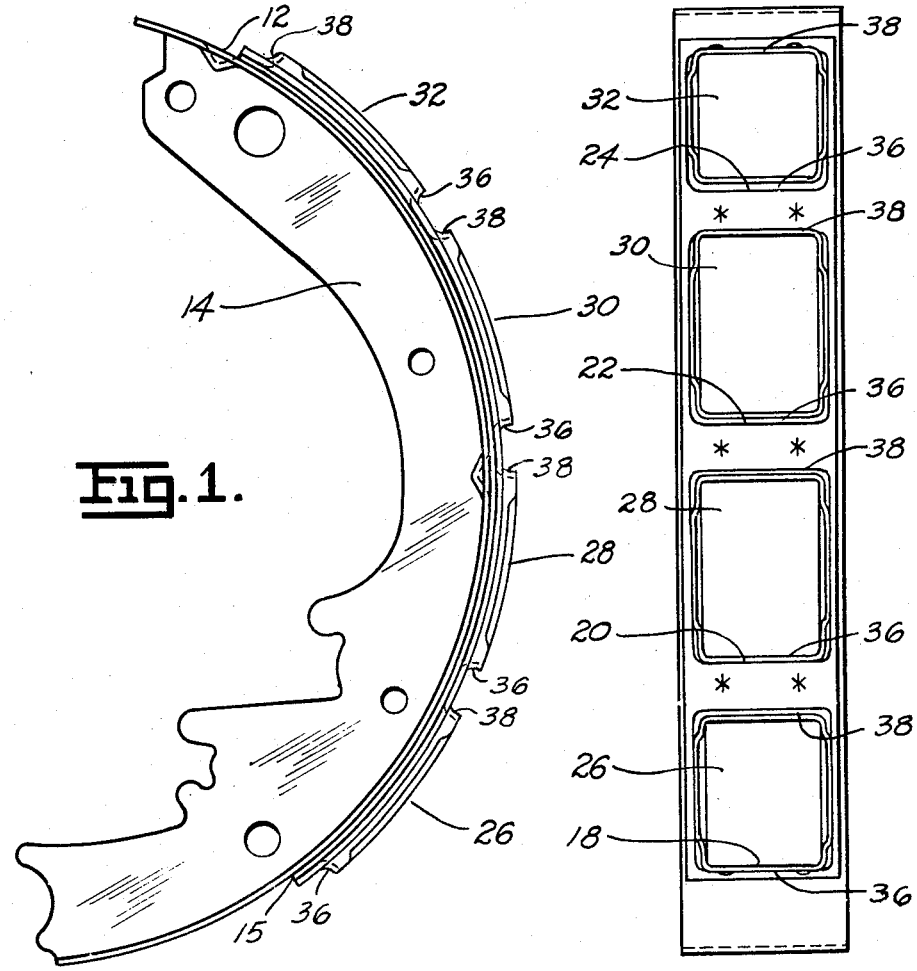
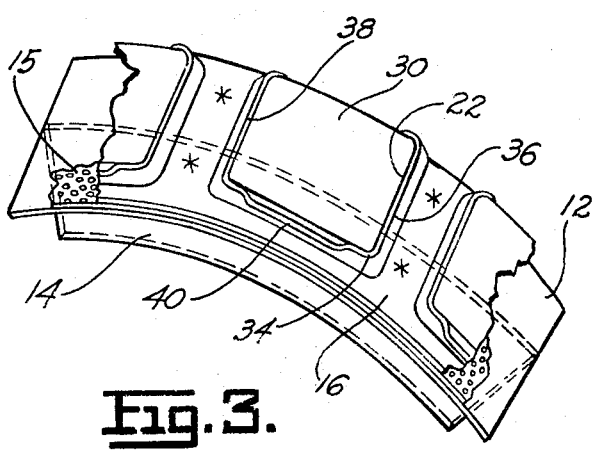

United States Patent Office 2,959,254
Patented Nov. 8, 1960

2,959,254

BRAKE SHOE CONSTRUCTION

James Alexander Riggs, South Bend, Ind., assignor to The Bendix Corporation, a corporation of Delaware Filed Aug. 30, 1956, Ser. No. 607,111

3 Claims. (Cl. 188—251)

This invention relates to a brake shoe construction having an inorganic friction material lining. The lining comprises a sintered metallic matrix and a ceramic friction-producing material which is embedded in said matrix. The described friction material can most conveniently be made in the form of segments instead of in one continuous arcuate strip as is the case with conventional organic type linings. For further details of composition and processing, reference may be made to copending application No. 602,480, filed July 20, 1956, now abandoned. The composition of the friction material forms no part of the present invention.

It is an object of this invention to provide a means for reliably securing the segments of friction material lining to a brake shoe and to further provide that the attaching means will have no scoring or damaging effect upon the opposing surface.

It is also an object of the invention to provide that the positioning means is economical to construct and service and is constructed to prevent excessive wear of the material and dislocation of the lining segments as they are used.

Other objects and features of the invention will become apparent from a consideration of the following description which proceeds with reference to the accompanying drawings, wherein:

Figure 1 is an elevation view of a brake shoe incorporating the invention;

Figure 2 shows the brake shoe looking from the right-hand side of Figure 1;

Figure 3 is a fragmentary isometric view of the brake shown in Figures 1 and 2; a part of the lining is broken away to show the various laminations;

Figure 4 is a fragmentary plan view of a stator of a disc brake embodying principles of the present invention; and Figure 5 is a fragmentary cross sectional view taken on the line 5—5 of Figure 4.

The brake shoe comprises a rim 12 and a transverse strengthening web 14 which is welded or staked to the rim 12 midway between the sides thereof. At the outer surface of the rim 12 is a perforated lamination 15 (Figure 3) which lies flat against the rim and is riveted or welded thereto.

A second lamination 16 is fitted over lamination 15. A plurality of blanks (Figure 2) 18, 20, 22 and 24 are formed in lamination 16 to receive lining segments 26, 28, 30, and 32, respectively. The blanks are designed to receive and hold the friction lining segments therein. The construction of each of the blanks is substantially the same so that only one will be described in detail.

The edges 34 of blank 22 extend upwardly from the surface of the rim. It will be noted that the edges form an approximately rectangular outline. The leading edge 36 and trailing edge 38 are tapered so that they lock the lining segment 30 therein and prevent its being dislodged during brake use. The side edges 40 are trimmed closer to the rim surface since adequate lateral support can be given the lining segment 30 by means of the leading and trailing edge. Also, there has been noted a reduced tendency for scoring of the opposing drum surface when the side edges 40 do not contact the drum surface.

The leading and trailing edges 36 and 38 both retain and support the lining segment. These edges hold the lining segment in place during use and prevent its crumbling or deteriorating under the influence of tangential braking loads. The leading and trailing edges 36 and 38 are wearable so that as the lining segment wears, the edges 36 and 38 reduce in thickness and remain at the same level as the rubbing surface of the lining segment.

The blanks and ridges surrounding the friction segments form protective retaining pockets for locating and reinforcing the respective lining segment. The blanked areas of lamination 16 expose the perforated lamination 15 to the undersurface of the lining segment so that when the brake is applied, the radial reaction force of the drum which acts normally against the rubbing surface of the lining segment 30 can force the lining against the perforations of lamination 15, said perforated lamination 15 providing an excellent gripping surface for the lining segments so that they resist circumferential movement relative to the shoe.

The blanked lamination 16 can be welded, riveted, or fixed mechanically to the rim 12. It is also possible as shown in Figures 4 and 5 to form laminations 15 and 16 in the form of an annular ring and use them in what is known as a "disc" type brake or clutch. In this case, the friction segments are distributed in a ring at spaced intervals around the circumference of the annular brake or clutch member. Also, it is not essential for low energy absorbing applications to provide the perforated lamination 15 between the rim 12 and lamination 16 as shown in Thompson Patent No. 1,771,594. Applicant has found, however, that structure without the perforated lamination 15 will chip and break out of the lamination 16 when used in high energy absorbing conditions where a high order of tangential loads are imposed at the braking surface; but that the preferred embodiment shown in the drawing and wherein the friction elements are clamped by the lamination 16 upon the perforated lamination 15 does not chip or grind away under the most severe braking applications encountered in present day automotive vehicles, as might be expected.

Numerous modifications and revisions of the invention are to be reasonably expected from those skilled in the art and it is my intention to include such revisions and changes that incorporate the principles of this invention, within the scope of the following claims.

I claim:

1. A brake shoe comprising a rim and a transverse strengthening web, a perforated first lamination which is formed over the outer surface of the rim to conform thereto, a second lamination placed over said first lamination and having a plurality of openings formed along the length thereof, the edges of said second lamination surrounding said openings being bent slightly outwardly to provide inclined surfaces forming an acute angle with respect to said first lamination, a plurality of friction segments having side edges which generally correspond in shape to said inclined surfaces of said second lamination, said friction segments being placed on said first lamination with said second lamination placed over the top of said segments with said inclined surfaces of said second lamination in engagement with said side edges of said segments, and means tightening and securing said second lamination to said rim through said first lamination.

2. A brake shoe comprising a rim and a transverse strengthening web, a perforated first lamination which is formed over the outer surface of the rim to conform thereto, a second lamination placed over said first lamination and having a plurality of openings formed along the length thereof, the edges of said second lamination surrounding said openings being bent slightly outwardly to provide inclined surfaces forming an acute angle with respect to said first lamination, a plurality of friction segments having side edges which generally correspond in shape to said inclined surfaces of said second lamination, said friction segments being placed on said first lamination with said second lamination placed over the top of said segments with said inclined surfaces of said second lamination in engagement with said side edges of said segments, and means tightening and securing said second lamination to said rim through said first lamination, said means being positioned a generally predetermined distance from said inclined surfaces of said second lamination.

3. A brake structure comprising: a support member having a perforated outer surface, a lamination placed over said perforated surface and having a plurality of openings formed along the length thereof, the edges of said lamination surrounding said openings being bent slightly outwardly to provide inclined surfaces forming an acute angle with respect to said perforated surface a plurality of friction segments having side edges which generally correspond in shape to said inclined surfaces of said lamination, said friction segments being placed on said perforated surface with said lamination placed over the top of said segments with said inclined surfaces of said lamination in engagement with said side edges of said segments, and means tightening and securing said lamination to said support member.

References Cited in the file of this patent

UNITED STATES PATENTS

| | | |
|---|---|---|
| 908,247 | Griffin | Dec. 29, 1908 |
| 1,771,594 | Thompson | July 29, 1930 |
| 1,907,490 | Brackett | May 9, 1933 |
| 1,941,656 | Blume | Jan. 2, 1934 |
| 1,950,260 | Nelson | Mar. 6, 1934 |
| 1,956,462 | Knuth | Apr. 24, 1934 |
| 2,070,947 | Klemm | Feb. 16, 1937 |
| 2,476,151 | Jeune | July 12, 1949 |
| 2,554,548 | Albagnac | May 29, 1951 |